No. 669,557. Patented Mar. 12, 1901.
A. L. STEVENS.
MOTOR VEHICLE.
(Application filed Jan. 6, 1900.)
(No Model.) 8 Sheets—Sheet 1.

WITNESSES:
James T. Duhamel.
S. I. Prescott

INVENTOR
Arthur L. Stevens
BY
Alvin K. Goodwin,
ATTORNEY

No. 669,557. Patented Mar. 12, 1901.
A. L. STEVENS.
MOTOR VEHICLE.
(Application filed Jan. 6, 1900.)

(No Model.) 8 Sheets—Sheet 4.

WITNESSES:
James F. Duhamel
S. J. Prescott

INVENTOR
Arthur L. Stevens
BY
Alvin K. Goodwin,
ATTORNEY

No. 669,557. Patented Mar. 12, 1901.
A. L. STEVENS.
MOTOR VEHICLE.
(Application filed Jan. 6, 1900.)

(No Model.) 8 Sheets—Sheet 5.

WITNESSES:
James F. Duhamel.
S. L. Prescott

INVENTOR
Arthur L. Stevens,
BY
Alvin K. Goodwin,
ATTORNEY

No. 669,557. Patented Mar. 12, 1901.
A. L. STEVENS.
MOTOR VEHICLE.
(Application filed Jan. 6, 1900.)
(No Model.) 8 Sheets—Sheet 8.

Fig. 16.

WITNESSES:
James F. Duhamel
S. J. Prescott

INVENTOR
Arthur L. Stevens,
BY
Alvin K. Goodwin,
ATTORNEY

UNITED STATES PATENT OFFICE.

ARTHUR L. STEVENS, OF NEW YORK, N. Y.

MOTOR-VEHICLE.

SPECIFICATION forming part of Letters Patent No. 669,557, dated March 12, 1901.

Application filed January 6, 1900. Serial No. 560. (No model.)

*To all whom it may concern:*

Be it known that I, ARTHUR L. STEVENS, a citizen of the United States of America, residing at the city of New York, borough of Manhattan, State of New York, have invented certain new and useful Improvements in Motor-Vehicles, of which the following is a specification.

My invention relates more especially to motor-vehicles or "automobiles" of any or every type, such as passenger-vehicles or goods-delivery wagons, and has for its object to promote the safety, certainty, and convenience of travel in or by such vehicles.

The invention consists in a special arrangement or combination, with the main axle having pivoted stub-axles on which the steering-wheels are mounted, of motors rotating said steering-wheels and sustained by the stub-axles and a special system of springs giving a yielding spring suspension of the motors from the stub-axles to promote the highest efficiency of the motors in rotating the driving steering-wheels and to secure maximum durability of the running-gear and body of the vehicle. With these stub-axles and springs giving this special spring suspension of the motors I have combined a simple and efficient screw-operated steering mechanism which gives the driver or motorman easy and perfect control of the vehicle.

The invention will first be described and then will be particularly defined in claims hereinafter set forth.

Reference is made to the accompanying drawings, forming part of this specification, in which—

Fig. 15 illustrates embodiment of the invention in an electrically-driven passenger-vehicle.

My invention is herein more particularly described as applied to electrically-propelled vehicles; but in some of its important novel features it is adapted also for use with vehicles using steam, gasolene, or other motors as a means of propulsion.

The numeral 1 indicates a road-wheel supporting the running-gear and vehicle-body and serving both as a traction and steering wheel. I place this driving steering-wheel 1 upon a stub-axle 2, which is held to the lower end of a vertical pivot 3, journaled in a bearing 4, which is rigidly fastened by bolts 5 to a laterally-projecting portion of a lower running-gear frame 6, which really is the support for the wheel-axle 2. As shown, this frame is made of iron channel-bars bolted to brace-plates, and the bolts 5 pass through the ends of these bars and through a tongue or stem 7, rigidly fastened to the axle pivot-bearing 4. The driving-wheel may rotate upon a stub-axle projecting rigidly from the pivot 3; but I now prefer to use an axle 2, on which the wheel is rigidly fixed and which rotates in antifriction metal boxes 8 8, fastened in opposite ends of a sleeve 9, which at its outer end is rigidly fastened to the lower end of pivot 3, as more clearly shown in Fig. 9 of the drawings. In either case it is obvious that the driving-wheel 1 may be turned bodily in horizontal plane, or nearly so, for steering purposes by any means turning the pivot 3 in its bearing 4—such, for instance, as an arm 10, movable by a rod 11 of a steering mechanism, a preferred specially-adapted construction of which is hereinafter described.

The driving-wheel preferably has a fixed toothed gear-wheel 12, which is engaged by a pinion 13 on the shaft 14 of a motor 15, which is here shown as an electric motor and is rigidly held by suitable brackets 16 to the sleeve 9. In this preferred arrangement the motor is hung off its center of gravity at the axis of rotation of the driving-wheel 1. Hence the motor-pinion 13 will remain in true pitch-line operative engagement with the gear-wheel 12 under any conditions of travel of the vehicle, and maximum effectiveness and durability of the driving mechanism and easy non-jarring propulsion of the vehicle are thereby assured.

The more special object of hanging the motor off its center of gravity to the axle-support is to cause the overhanging weight of the motor to exert a vertically torsional and tilting strain on said axle-support 6, which is resisted, as shown in Figs. 1 to 8 of the drawings, by the yielding springs 17 18, which sustain the bed or floor-frame 19 of the vehicle-body 20 from said axle-support. The opposite side springs 17 resist the larger share of this torsional tilting of the axle-support by the overhanging weight of the motor or both motors, when two driving-wheels and motors are employed, as herein shown. It is obvious that the motor thus is given a free spring suspension by means of its overhanging weight tilting the axle-support, this tilting movement being resisted by the springs. The motor thus utilizes the elasticity of the body-supporting springs to prevent injurious jarring or racking of its mechanism and also to facilitate smooth non-jarring propulsion while the vehicle is starting or is running over uneven roads and without any direct connection of the motor with the body of the vehicle. The motor and its operative connection with the driving-wheel thus are not in any manner injuriously affected by any possible swaying or rocking of the vehicle-body, which movements are practically taken up or absorbed by the body-supporting springs independently of the motor or motors.

In so far as concerns the spring suspension of the motor, the driving-wheel axle (whether rotary or non-rotary) and the pivot-bearing sustaining it are practically a portion of the axle-support, as these parts all tilt together under the overhanging weight of the motor and as resisted yieldingly by the body-supporting springs. This free spring suspension of the motor is obtainable with various forms of springs, while permitting the driving-wheel to be used also as a steering-wheel One preferred arrangement of duplex or multiple side springs which I propose to use on a "hansom-cab" vehicle will be hereinafter described.

I have specially combined with the driving-wheel and axle-support a simple and effective steering mechanism which does not interfere with the motor spring suspension and is unaffected by it or by the rocking or varying level of the vehicle-body as now described. To the axle-support 6 is fixed a laterally-extending guide-bar 21, on which moves one or more slides 22, rigidly fastened to a yoke or frame 23, having end arms 24 24, in which is fixed a laterally-arranged screw 25, which does not rotate, but may move laterally with the yoke. I prefer to hold the screw to the yoke by split clamp-collars 26, fitting reduced parts of the screw next the arms 24, and by pins 27, passed through said arms and the screw, as more clearly shown in Figs. 4 and 5 of the drawings. The screw-engaging nut 28 rotates in a bracket 29, fixed to axle-support 6, and is held immovable endwise by a pinned collar 30. On this nut is formed or fixed a bevel-pinion 31, engaged by a gear 32, fixed to the lower part 33 of a universally-jointed spindle, hereinafter described, and actuated by the driver or motorman. To opposite ends of yoke 23 are coupled the inner ends of the above-named connecting-rods 11 11, which are so attached to the laterally-inclined arms 10 10, fixed to the driving-wheel-axle pivots 3 3, that as nut 28 is turned by gearing 31 32 in one direction or the other the screw 25, yoke 23 24, and rods 11 11 will together be moved laterally to the right or left hand to bodily turn the road or driving wheels 1 1 for steering the vehicle in the desired direction. The screw is about laterally alined with the center of the axle-support 6 and wheel-pivots 3. Hence the tilting of this support by the overhanging weight of the motors 15 does not interfere with the operation of the steering mechanism, which reciprocally does not affect the motor spring suspension.

The above-named spindle part 33 is journaled in the vertical upper bearing of bracket 29, and the gear-wheel 32 is both keyed and pinned to said part 33, which is coupled by a universal joint 34 with the next upper spindle part 35, which in turn is coupled by universal joint 36 to the top portion 37 of the spindle. Part 37 fits loosely within a sleeve 38 and has a key 39 entering a vertical slot 40 of this sleeve. Said sleeve is suitably fastened to a hand-wheel 41 or other operating means, which is journaled at the top of a tubular casing 42, inclosing sleeve 38 and fastened below to a downwardly-flaring hollow standard 43, in which spindle portion 37 has a bearing. This standard is fixed to the floor of the vehicle-body 20, which has an opening 44, corresponding with the inner chamber of the standard, thus permitting swaying or rocking of the body in any direction and to any extent without interfering with the universally-jointed spindle or its connections with the steering gear-wheel 32. The casing 42 is shown braced at 45 to the driver's seat 46. As the wheel 41 is turned it rotates sleeve 38, whose slot 40 acts on key 39 to turn the entire spindle 37 33, and thereby operate the steering mechanism. The slot 40 is long enough to permit any possible variation of level of the vehicle-body under varying loads, while maintaining operative connection of the hand-wheel and spindle.

Figures 1, 2, 3:
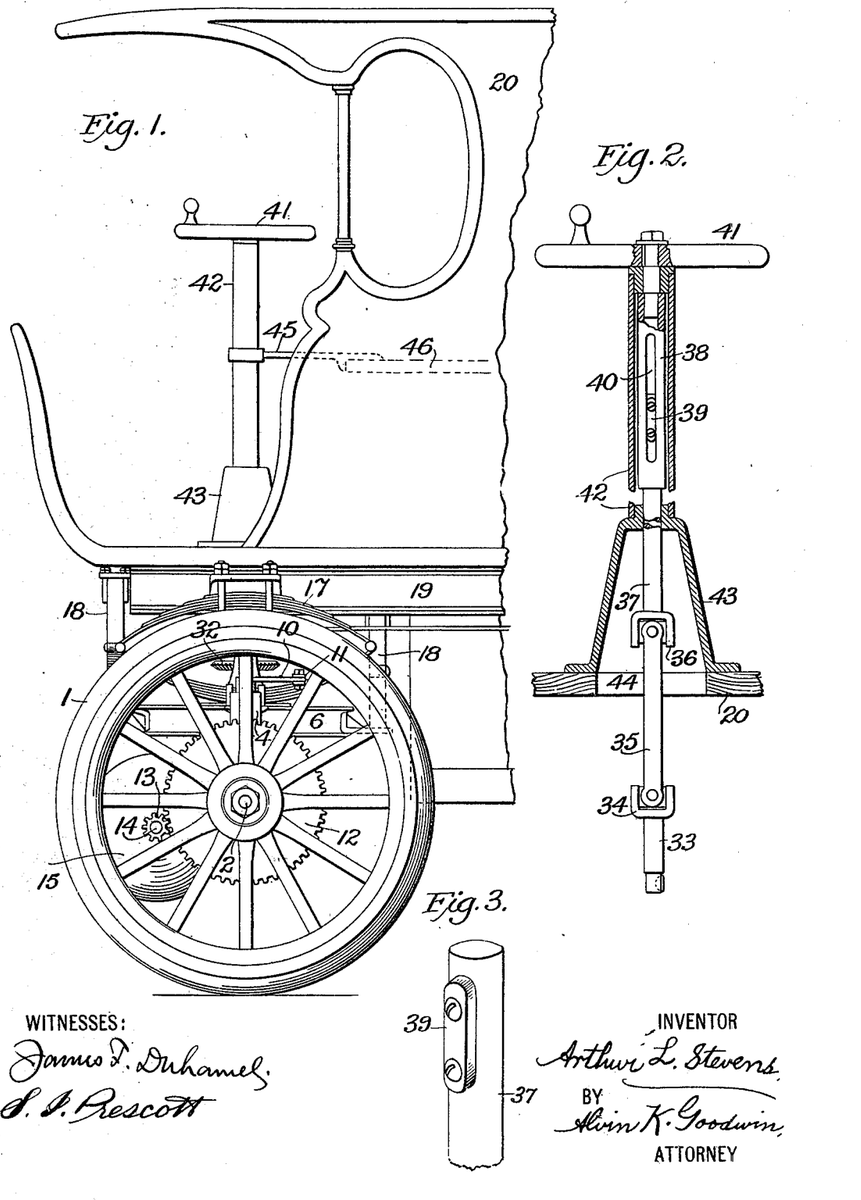
Figure 1 is a side elevation of the front end of an electrically-driven goods-delivery wagon embodying my invention.
Fig. 2 is an enlarged vertical sectional view of the hand-operated means actuating the steering mechanism.
Fig. 3 is a detail of the telescoping shaft thereof.
Figures 4, 5:
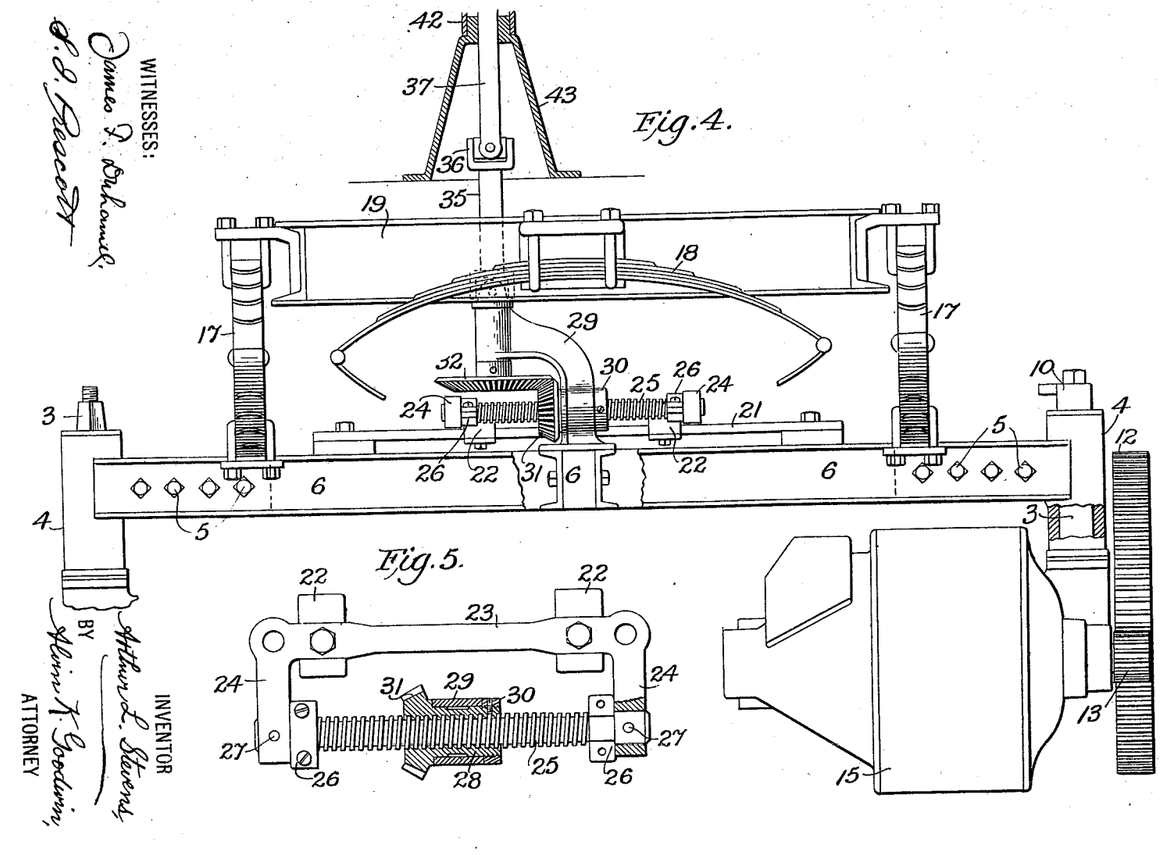
Fig. 4 is an enlarged front broken sectional view of one arrangement of the vehicle running-gear, one motor and both steering-wheels being removed.
Fig. 5 is a further-enlarged sectional plan of the laterally-traveling screw and yoke and the relatively stationary nut of the steering mechanism.
Figure 6:
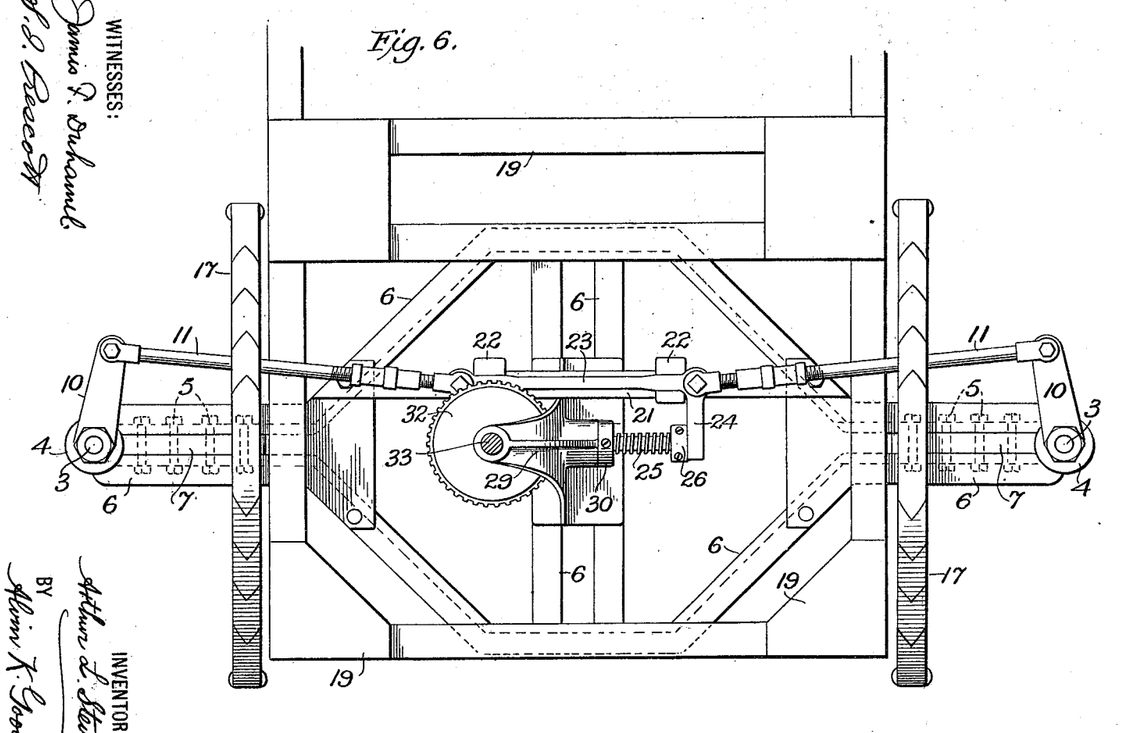
Fig. 6 is a plan view showing the connections of the screw with the steering-wheel pivots.
Figure 7:
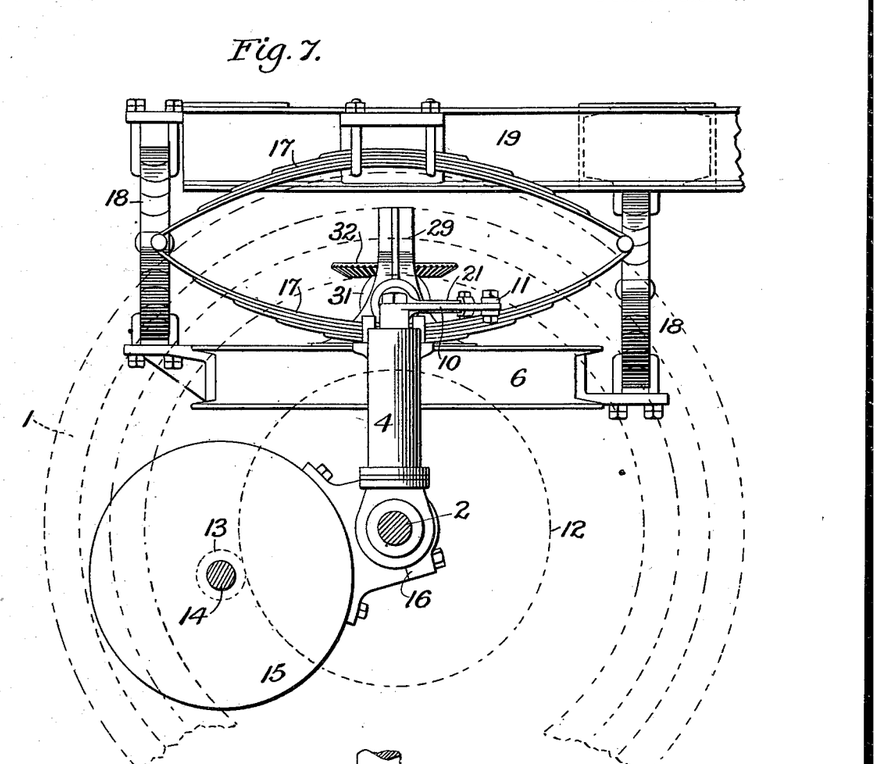
Fig. 7 is a side view of parts in Fig. 6 with the driving steering-wheel partly indicated by dotted lines.
Figure 8:
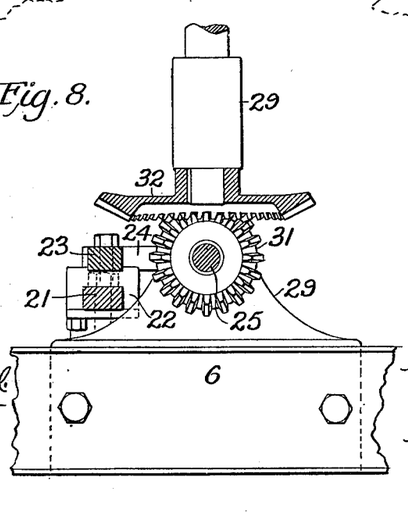
Fig. 8 is a detail vertical section of parts of the steering mechanism.
Figure 9:
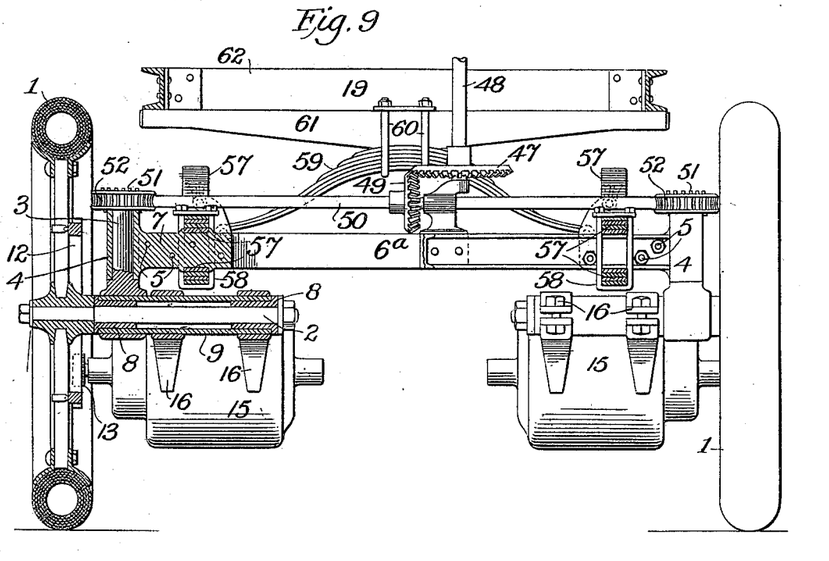
Fig. 9 is a sectional front view, Fig. 10 a side elevation, and Fig. 11 a partly-broken plan view, showing a preferred motor spring suspension and modified steering-gear.
Figure 10:
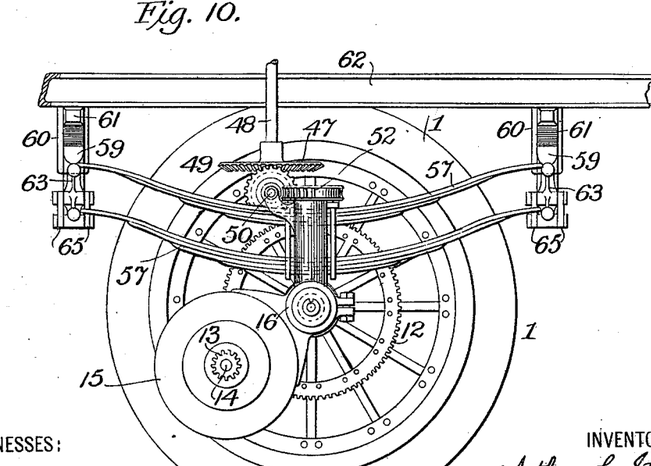
Figure 11:
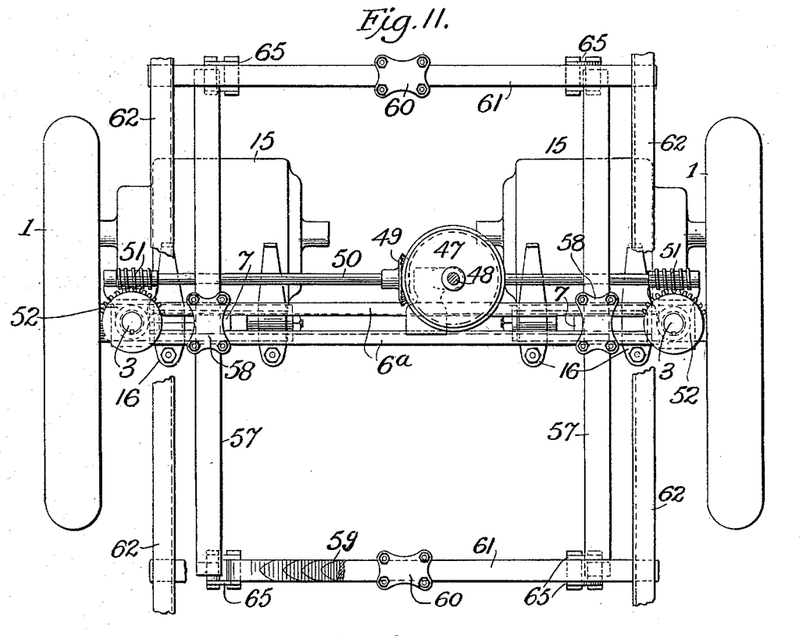
Figure 12:
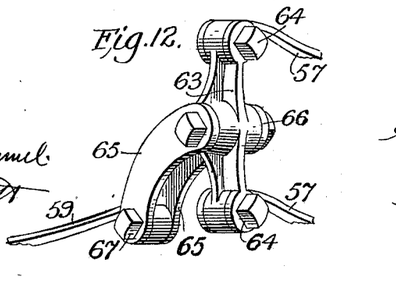
Fig. 12 is a perspective view of the coupling of the side and cross springs shown in the last four views.
Figure 13:
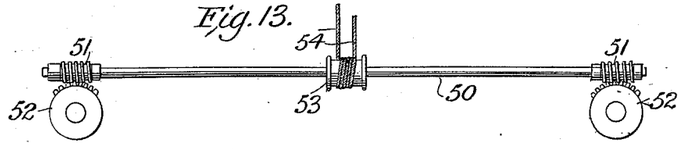
Figs. 13 and 14 show further modifications of the steering-gear.
Figure 14:
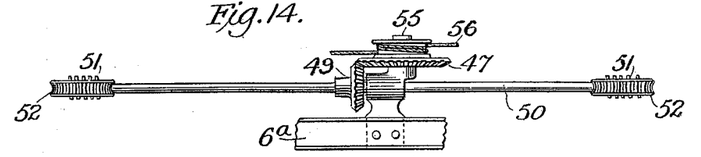

Modifications of a steering mechanism adapted for use with the herein-described spring suspension of the motors are shown in Figs. 9, 10, 11, 13, and 14 of the drawings. In Figs. 9, 10, and 11 a bevel gear-wheel 47 is fixed to a vertical operating-shaft 48 and engages a bevel-pinion 49 on a lateral shaft 50, journaled on the axle-support 6 and bearings 4 and having worm-gears 51 51, engaging teeth on segmental gears 52 52, fixed to the axle-supporting pivots 3 3 of the driving-wheels. In this case both driving-wheels are inclined at like angles on the inner and outer curves described by said wheels in turning the vehicle. Fig. 13 shows how I may use a vertically-rotating drum 53 and rope or chain 54, leading therefrom to any suitable pulley or winding device in control of the motorman, and Fig. 14 shows how a horizontally-turning drum 55, with operating rope or chain 56, may be used to turn gear-wheel 47 to actuate the worm-shaft 50 instead of the shaft 48 above mentioned.

I specially mention the duplex or multiple substantially parallel or similarly-acting half-oval or semi-elliptic leaf-springs 57 57, arranged one above the other and coupled by any suitable clevis or shackle 58 to the axle-support $6^a$, (more clearly shown in Figs. 9 and 11,) and which differs only in form from the support 6 of Figs. 1 to 4 of the drawings. Said support $6^a$ comprises two parallel channel-bars bolted to interposed plates, the outer end plates being the tongues 7 of the axle pivot-bearings 4 and secured by bolts 5, substantially as above described. I am not limited to two springs 57 at each side of the vehicle-body, as more than two side springs having substantially similar form or action may be used, one above the other, and these side springs may be coupled to lateral springs or directly to the vehicle-body, according to the type of vehicle on which they are used.

In Figs. 9 to 12 of the drawings I show two superposed springs 57 57 at each side of the vehicle and connected at opposite ends by specially-devised couplings to each other and to arched leaf-springs 59, secured by clevises 60 to bolsters 61 of the platform 62 of a goods-delivery wagon or truck. The couplings connecting the springs are more clearly shown in Fig. 12 and comprise a vertical shackle 63, to which the ends of two springs 57 57 are pivoted at 64, and two clevis-plates 65, pivoted to opposite faces of shackle 63 by a bolt 66, ranging about at right angles to pivots 64. To the lower ends of plates 65 the end of the lateral spring 59 is pivoted by a bolt 67, ranging about parallel to bolt 66. A free flexing of all the springs thus is permitted without affecting the spring suspension of the motors, which is derived mainly from the flexing of springs 57 by tilting of the axle-support $6^a$ by the overhanging weight of motors 15.

Figure 15:
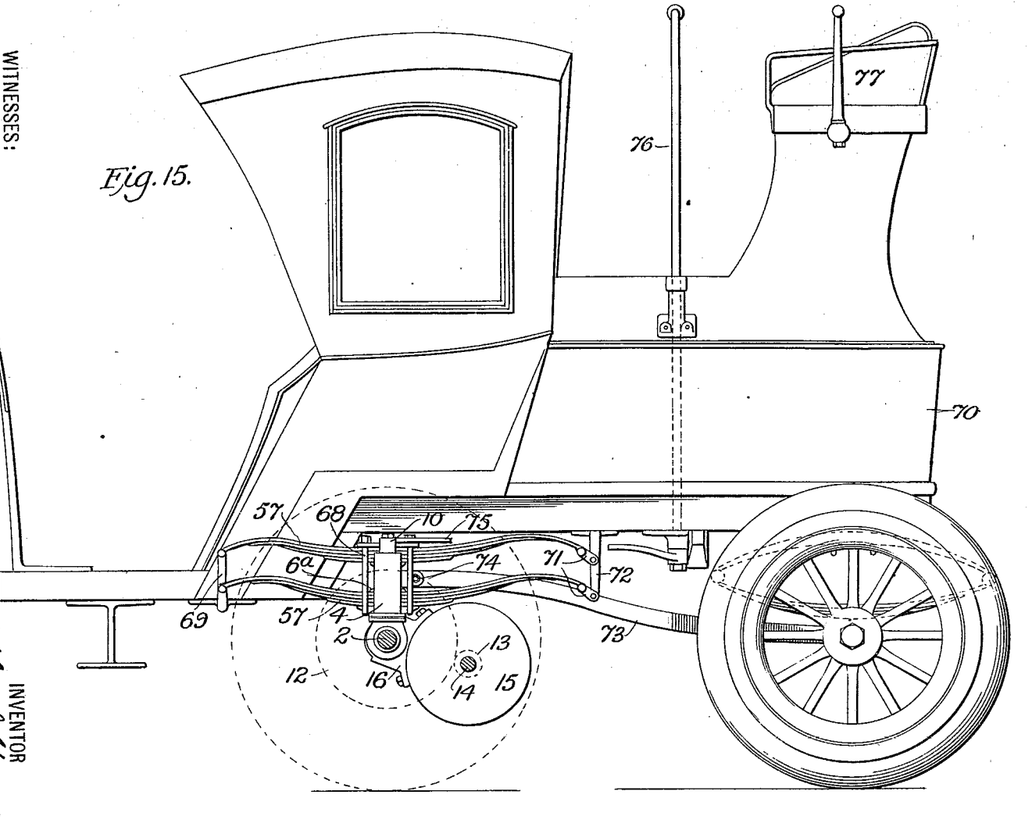
Figure 16:
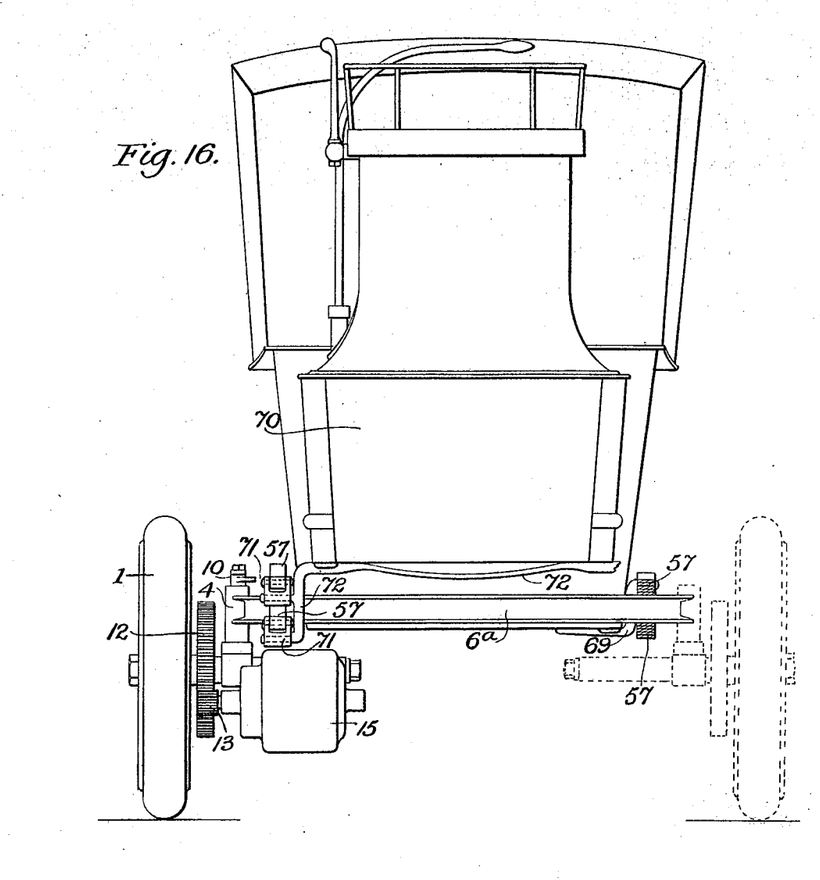
Fig. 16 is a rear view of the same, showing only the front driving steering-gear and partly in dotted lines.

In Figs. 15 and 16 the two side springs 57 57 are coupled by clevis 68 to a transverse axle-support $6^a$, and the front ends of these springs are pivoted to lateral projections of a gooseneck forging 69, fixed to the body 70 of the vehicle, which in this instance is a four-wheeled electrically-operated hansom-cab. The rear ends of the side springs are pivoted to swinging shackles 71, the other ends of which are pivoted to a forging 72, preferably extending across under the vehicle-body and having downbent ends, to each of which one set of shackles 71 is connected. These shackles 71 permit free vertical play of the vehicle-body under varying loads on varying roads and also allow free tilting of the axle-support $6^a$ by the overhanging weight of motors 15 to realize their spring suspension from these same body-supporting springs 57, substantially as hereinbefore described.

While the use of the duplex or multiple side springs 57 57, coupled to the front main axle and hansom-body as above described, makes the use of a reach unnecessary as regards this front axle and its springs, the rear road-wheel axle and springs need a fore-and-aft bracing. Hence I use a reach 73, which extends forward from the rear axle and is pivoted at 74 to the front axle-support $6^a$, which may tilt freely under weight of the motors 15 independently of the reach, which thus does not interfere with the spring suspension of the motors. The two front wheels 1 1 of this hansom are both driving and steering wheels, the steering being effected by rod connections 75, of any suitable character, extending from the wheel pivot-arms 10 to the lower end of the ordinary steering rod or lever 76, in reach of the motorman on the rear seat 77. One special advantage or value of these duplex or multiple superposed side springs 57 arises from their decreased individual weight and increased elasticity and consequent greater sensitiveness to flexing by the overhanging weight of the motors to assure the least possible jar to the spring-suspended motors and to the vehicle or passengers or goods when starting or when traveling on rough roads. These side springs are particularly adapted for use on hansom-cabs of any class or for light delivery-wagons fitted with full or half platform-springs substantially in the manner herein shown and described.

In experimentally developing this spring suspension of the motors I tried a single side spring 57, coupled to the delivery-wagon cross-springs or to the hansom-body; but the weight of the suspended motors downwardly over-bent one half or end of this spring and unduly compressed its leaves and unduly bent upward the other end or half of the spring, thereby upwardly separating its leaves. This not only destroyed the symmetry of the spring, but greatly impaired its practical value as an elastic support for the vehicle-body. I then used two superposed springs 57 57, as herein described, and these proved satisfactory in that the above-named reverse vertical flexing tendencies of the leaves of opposite end portions of the springs did not appear and the spring suspension of the motors was perfect and maximum elasticity and durability of the springs were obtained, these results probably arising mostly from the mutual endwise resistance of the superposed springs upon or against each other through the medium of their connections to the axle and to the delivery-wagon cross-springs or to the axle and "hansom-body." This spring suspension of the motors from or by aid of duplex or multiple side springs connecting the main axle and vehicle-body may be secured in various styles of vehicles having steering-wheels mounted on horizontally-movable stub-axles held to the main axle substantially as herein described, and the improved practical results will in every case be the same as regards lessening of wear and tear of both the vehicle and motors, while assuring the most easy riding and the safest and most positive propulsion of the vehicle.

It is obvious that several of the special improvements embodied in my invention may be used with reference to a single driving steering-wheel on a bicycle or tricycle or other vehicle. Hence I have in the appended claims separately specified improved features of construction as applied to both one driving-wheel and two driving steering-wheels.

I claim as my invention—

1. In a motor-vehicle, the combination, with the main axle or axle-support, of a stub-axle held thereto by a vertical pivot, a steering road-wheel placed on said stub-axle and horizontally movable therewith, means controlling horizontal movements of the steering-wheel, springs held to the main axle or axle-support and sustaining the vehicle-body therefrom, and a motor held off its center of gravity to the stub-axle and rotatively engaging the steering road-wheel while having a spring suspension from the body-supporting springs.

2. In a motor-vehicle, the combination, with the main axle or axle-support, of a stub-axle held thereto at each end by a vertical pivot, a steering road-wheel placed on each stub-axle and horizontally movable therewith, means controlling horizontal movements of both steering-wheels, springs held to the main axle or axle-support and sustaining the vehicle-body therefrom, and a motor held off its center of gravity to each stub-axle and rotatively engaging the steering road-wheel thereon, while having a spring suspension from the body-supporting springs.

3. In a motor-vehicle, the combination, with the main axle or axle-support, of a stub-axle held thereto by a vertical pivot, a steering road-wheel placed on said stub-axle and horizontally movable therewith, means controlling horizontal movements of the steering-wheel, duplex or multiple superposed side springs clipped at intermediate parts to the main axle or axle-support, connections from the ends of said superposed side springs to the vehicle-body, and a motor held off its center of gravity to the stub-axle and rotatively engaging the steering road-wheel while having a spring suspension from the duplex or multiple superposed side springs which sustain the vehicle-body from the main axle or axle-support.

4. In a motor-vehicle, the combination, with the main axle or axle-support, of a stub-axle held thereto at each end by a vertical pivot, a steering road-wheel placed on each stub-axle and horizontally movable therewith, means controlling horizontal movements of both steering-wheels, duplex or multiple superposed side springs clipped at intermediate parts to the main axle or axle-support, connections from the ends of said superposed side springs to the vehicle-body, and a motor held off its center of gravity to each stub-axle and rotatively engaging the steering road-wheel thereon while having a spring suspension from the duplex or multiple superposed side springs which sustain the vehicle-body from the main axle or axle-support.

5. In a motor-vehicle, the combination, with the main axle or axle-support, of a vertical pivot journaled thereto and carrying a horizontal sleeve, bearings in this sleeve, a stub-axle journaled in said bearings, a steering road-wheel fixed to and rotating with said stub-axle and horizontally movable therewith, springs held to the main axle or axle-support and sustaining the vehicle-body therefrom, and a motor fixed to the sleeve and sustained thereby off its center of gravity and rotatively engaging the steering road-wheel while having a spring suspension from the body-supporting springs.

6. In a motor-vehicle, the combination, with the main axle or axle-support, of a vertical pivot journaled thereto at each end and carrying a horizontal sleeve, bearings in said sleeves, a stub-axle journaled in the bearings of each sleeve, a steering road-wheel fixed to and rotating with each stub-axle and horizontally movable therewith, springs held to the main axle or axle-support and sustaining the vehicle-body therefrom, and a motor fixed to each sleeve and sustained thereby off its center of gravity and rotatively engaging the adjacent steering road-wheel while having a spring suspension from the body-supporting springs.

7. In a motor-vehicle, the combination, with the main axle or axle-support, of a stub-axle held thereto by a vertical pivot, a steering road-wheel placed on said stub-axle and horizontally movable therewith, springs held to the main axle or axle-support and sustaining the vehicle-body therefrom, a motor held off its center of gravity to the stub-axle and rotatively engaging the steering road-wheel thereon while having a spring suspension from the body-supporting springs, screw-gearing sustained on the axle-support, and connections from said screw-gearing to the stub-axle bodily moving it and the driving-wheel thereon for steering the vehicle.

8. In a motor-vehicle, the combination, with the main axle or axle-support, of a stub-axle held thereto at each end by a vertical pivot, a steering road-wheel placed on each stub-axle and horizontally movable therewith, springs held to the main axle or axle-support and sustaining the vehicle-body therefrom, a motor held off its center of gravity to each stub-axle and rotatively engaging the steering road-wheel thereon while having a spring suspension from the body-supporting springs, screw-gearing sustained on the axle-support, and connections from said screw-gearing to both stub-axles bodily moving them and the driving-wheels for steering the vehicle.

9. In a motor-vehicle, the combination, with the main axle or axle-support, of a stub-axle held thereto at each end by a vertical pivot, a steering road-wheel placed on each stub-axle and horizontally movable therewith, duplex or multiple superposed side springs clipped at intermediate parts to the main axle or axle-support, connections from the ends of said superposed side springs to the vehicle-body, a motor held off its center of gravity to each stub-axle and rotatively engaging the steering road-wheel thereon while having a spring suspension from the duplex or multiple superposed side springs which sustain the vehicle-body from the axle or axle-support, screw-gearing sustained on the axle-support, and connections from said screw-gearing to both stub-axles bodily moving them and the driving-wheels for steering the vehicle.

10. In a motor-vehicle, the combination, with the main axle or axle-support, of a stub-axle held thereto by a vertical pivot, a steering road-wheel placed on said stub-axle and horizontally movable therewith, springs held to the main axle or axle-support and sustaining the vehicle-body therefrom, a motor held off its center of gravity to the stub-axle and rotatively engaging the steering road-wheel thereon while having a spring suspension from the body-supporting springs, screw-gearing sustained on the axle-support, and connections from said screw-gearing to the stub-axle bodily moving it and the driving-wheel thereon for steering the vehicle and including a universally-jointed telescoping spindle operative by the driver and permitting rocking and varying level of the vehicle-body.

11. In a motor-vehicle, the combination, with the main axle or axle-support, of a stub-axle held thereto at each end by a vertical pivot, a steering road-wheel placed on each stub-axle and horizontally movable therewith, springs held to the main axle or axle-support and sustaining the vehicle-body therefrom, a motor held off its center of gravity to each stub-axle and rotatively engaging the steering road-wheel thereon while having a spring suspension from the body-supporting springs, screw-gearing sustained on the axle-support, and connections from said screw-gearing to both stub-axles bodily moving them and the driving-wheels thereon for steering the vehicle and including a universally-jointed telescoping spindle operative by the driver and permitting rocking and varying level of the vehicle-body.

12. In a motor-vehicle, the combination, with the main axle or axle-support, of a stub-axle held thereto by a vertical pivot, a steering road-wheel placed on said stub-axle and horizontally movable therewith, means connecting the main axle or axle-support with the vehicle-body, a guide on the axle-support, a screw movable bodily on said guide, a nut thus moving the screw, means rotating the nut, and connections from the screw to the stub-axle bodily moving it and its wheel for steering the vehicle as the nut is rotated.

13. In a motor-vehicle, the combination, with the main axle or axle-support, of a stub-axle held thereto by a vertical pivot, a steering road-wheel placed on said stub-axle and horizontally movable therewith, means connecting the main axle or axle-support with the vehicle-body, a guide on the axle-support, a screw movable bodily on said guide, a nut thus moving the screw, means rotating the nut including a universally-jointed telescoping spindle operative by the driver and permitting rocking and varying level of the vehicle-body, and connections from the screw to the stub-axle bodily moving it and its wheel for steering the vehicle as the nut is rotated.

14. In a motor-vehicle, the combination, with the main axle or axle-support, of a stub-axle held thereto at each end by a vertical pivot, a steering road-wheel placed on each stub-axle and horizontally movable therewith, means connecting the main axle or axle-support with the vehicle-body, a guide on the axle-support, a screw movable bodily on said guide, a nut thus moving the screw, means rotating the nut, and connections from the screw to both stub-axles bodily moving them and their wheels for steering the vehicle as the nut is rotated.

15. In a motor-vehicle, the combination, with the main axle or axle-support, of a stub-axle held thereto at each end by a vertical pivot, a steering road-wheel placed on each stub-axle and horizontally movable therewith, means connecting the main axle or axle-support with the vehicle-body, a guide on the axle-support, a screw movable bodily on said guide, a nut thus moving the screw, means rotating the nut including a universally-jointed telescoping spindle operative by the driver and permitting rocking and varying level of the vehicle-body, and connections from the screw to both stub-axles bodily moving them and their wheels for steering the vehicle as the nut is rotated.

16. In a motor-vehicle, the combination, with the main axle or axle-support, of a stub-axle held thereto by a vertical pivot, a steering-wheel placed on said stub-axle and horizontally movable therewith, springs held to the main axle or axle-support and sustaining the vehicle-body therefrom, a motor held off its center of gravity to the stub-axle and rotatively engaging the steering road-wheel while having a spring suspension from the body-supporting springs, a guide on the axle-support, a screw movable bodily on said guide, a nut thus moving the screw, means rotating the nut, and connections from the screw to the stub-axle bodily moving it and its wheel for steering the vehicle as the nut is rotated.

17. In a motor-vehicle, the combination, with the main axle or axle-support, of a stub-axle held thereto by a vertical pivot, a steering road-wheel placed on said stub-axle and horizontally movable therewith, springs held to the main axle or axle-support and sustaining the vehicle-body therefrom, a motor held off its center of gravity to the stub-axle and rotatively engaging the steering road-wheel while having a spring suspension from the body-supporting springs, a guide on the axle-support, a screw bodily movable on said guide, a nut thus moving the screw, means rotating the nut including a universally-jointed telescoping spindle operative by the driver and permitting rocking and varying level of the vehicle-body, and connections from the screw to the stub-axle bodily moving it and its wheel for steering the vehicle as the nut is rotated.

18. In a motor-vehicle, the combination, with the main axle or axle-support, of a stub-axle held thereto at each end by a vertical pivot, a steering road-wheel placed on each stub-axle and horizontally movable therewith, springs held to the main axle or axle-support and sustaining the vehicle-body therefrom, a motor held off its center of gravity to each stub-axle and rotatively engaging the steering road-wheel thereon while having a spring suspension from the body-supporting springs, a guide on the axle-support, a screw movable bodily on said guide, a nut thus moving the screw, means rotating the nut, and connections from the screw to both stub-axles bodily moving them and the driving-wheels thereon for steering the vehicle as the nut is rotated.

19. In a motor-vehicle, the combination, with the main axle or axle-support, of a stub-axle held thereto at each end by a vertical pivot, a steering road-wheel placed on each stub-axle and horizontally movable therewith, springs held to the main axle or axle-support and sustaining the vehicle-body therefrom, a motor held off its center of gravity to each stub-axle and rotatively engaging the steering road-wheel thereon while having a spring suspension from the body-supporting springs, a guide on the axle-support, a screw movable bodily on said guide, a nut thus moving the screw, means rotating the nut including a universally-jointed telescoping spindle operative by the driver and permitting rocking and varying level of the vehicle-body, and connections from the screw to both stub-axles bodily moving them and the driving-wheels thereon for steering the vehicle as the nut is rotated.

20. In a motor-vehicle, the combination, with the main axle or axle-support sustained by the road-wheels, of duplex or multiple superposed side springs clipped at intermediate parts to said axle or axle-support, cross-springs held at intermediate parts to the vehicle-body, and shackles pivotally connecting the ends of the duplex or multiple superposed side springs to end parts of the cross-springs.

21. In a motor-vehicle, the combination, with the main axle or axle-support, of stub-axles held thereto by vertical pivots, steering road-wheels placed on said stub-axles and movable horizontally therewith, means controlling horizontal movements of the steering-wheels, duplex or multiple superposed side springs clipped at intermediate parts to the main axle or axle-support, cross-springs held at intermediate parts to the vehicle-body, shackles pivotally connecting the ends of the duplex or multiple superposed side springs to end parts of the cross-springs, and motors held off their center of gravity to the stub-axles and rotatively engaging the steering road-wheels while having a spring suspension from the body-supporting springs.

ARTHUR L. STEVENS.

Witnesses:
SYDNEY I. PRESCOTT,
ALVIN K. GOODWIN.